(12) United States Patent
Martin et al.

(10) Patent No.: US 6,660,820 B1
(45) Date of Patent: Dec. 9, 2003

(54) LOW DIELECTRIC CONSTANT POLYMER AND MONOMERS USED IN THEIR FORMATION

(75) Inventors: Arthur Martin, Glenham, NY (US); Wei-Tsu Tseng, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/205,278

(22) Filed: Jul. 24, 2002

(51) Int. Cl.[7] .................. C08F 136/16; C08G 63/78; C08G 73/24

(52) U.S. Cl. ............... 526/252; 528/86; 528/205; 528/220; 528/397; 528/401; 526/251; 526/255; 526/247; 526/285

(58) Field of Search .............. 528/86, 205, 220, 528/397, 461; 526/285, 247, 251, 252, 255

(56) References Cited

U.S. PATENT DOCUMENTS

| | | |
|---|---|---|
| 5,552,503 A | 9/1996 | Kwock et al. |
| 5,827,907 A | 10/1998 | Gotro et al. |
| 5,834,537 A | 11/1998 | Gotro et al. |
| 5,965,679 A | 10/1999 | Godschalx et al. |
| 6,124,421 A | 9/2000 | Lau et al. |
| 6,288,188 B1 | 9/2001 | Godschalx et al. |

OTHER PUBLICATIONS

Peters, Semiconductor Inter., 63–74 (1998).
Martin et al., Synthesis of Substituted Aryl Acetyslenes, published Aug. 1991.

*Primary Examiner*—Samuel A. Acquah
(74) *Attorney, Agent, or Firm*—Scully, Scott, Murphy & Presser; Margaret Pepper

(57) ABSTRACT

A new class of fluorinated arylacetylene compounds useful as monomers in the formation of polymers having low dielectric constant. These polymers, which are the reaction products of one of the fluorinated arylacetylene compounds, a diphenyl oxide biscyclopentadienone and, optionally, 1,3,5-tris(phenylacetylene)benzene, are useful in insulating microelectric device.

17 Claims, No Drawings

LOW DIELECTRIC CONSTANT POLYMER AND MONOMERS USED IN THEIR FORMATION

BACKGROUND OF THE DISCLOSURE

1. Field of the Invention

The present invention is directed to a new class of fluorinated aryl acetylenes useful as monomers in the polymerization of a low dielectric constant polymer which has excellent thermal stability. In addition, the present invention is directed to a polymeric reaction product of the new class of fluorinated aryl acetylenes, a diphenyloxide biscyclopentadienone and, optionally, 1,3,5-tris(phenylacetylene) benzene.

2. Background of the Prior Art

The continuing decrease in the size of integrated circuits has resulted in the development of dramatically decreased size integrated circuits wherein the spaces between individual devices or elements thereon are similarly diminished. This development has put increased insulative demand upon insulators, disposed between conductive paths, to prevent "cross-talk," shorts and other integrated circuit failures. A limiting factor in the development of these devices has been the inability to insulate between decreased conductive paths which these insulative layers separate.

This problem has been addressed in the prior art by the development of fluorine silicate glass (FSG) films. However, these films, effective in the relatively large size integrated circuits of recent years, have proven inadequate insofar as the dielectric constant of these films has proven to be too high to prevent "cross talk," shorting and other manifestations of capacitance failure in the much smaller integrated circuits presently in use or under development. The insulating films currently employed in electrically insulating conductive layers of integrated circuits, which are usually metallic layers, particularly copper layers, include little or no fluorine. The most recent of these new films are polyphenylenes, as exemplified by U.S. Pat. No. 5,965,679, which is incorporated herein by reference. These polyphenylene films, which are polymerized from a monomeric reaction product, are characterized by lower dielectric constants compared to films heretofore employed in this application.

Although these films represent a significant advance in the art, films having still further reduced dielectric constants are desired for the continued miniaturization of integrated circuits.

One such recent attempt is the attempt to modify a recently developed polyphenylene low dielectric constant film by adding fluorine thereto, based on the knowledge that fluorine-containing polymers have low dielectric constants, has proven unsuccessful. This is so in spite of the fact that the addition of a fluorine-containing co-monomer produces a polymeric product having reduced dielectric constant compared to equivalent polymers produced by prior art monomers which are free of fluorine.

The reason for this failure is that fluorinated polymeric films, which is the reaction product of monomers known in the prior art with an aliphatic fluorine-containing monomer, is that this film emits fluorine upon the application of heat. This fluorine reacts, especially in copper damascene structures, commonly utilized in present day integrated circuits, at the elevated temperatures at which integrated circuits operate, with tantalum to form volatile tantalum fluoride. This tantalum fluoride formation results in loss of adhesion between the insulating polymeric layer and the metal, e.g. copper, surface.

It is thus apparent that there is a significant need in the art for a fluorinated polymeric film having the same degree of thermal inertness characteristic of prior art FSG films but which has a significantly lower dielectric constant so that even thinner layers of that polymeric film may be employed in the effective insulation of conductive layers of present day integrated circuits.

The preparation of substituted aryl acetylenes is known in the art. Martin et al., "Synthesis of Substituted Aryl Acetylenes", published August, 1991, exemplifies this teaching in the prior art.

Peters, *Semiconductor Inter.*, 63–74 (September, 1998) provides a general background article describing the development of low dielectric constant materials for use in integrated circuits. This article evidences the concern in the art for improved low dielectric constant interlevel insulators.

U.S. Pat. No. 5,552,503 to Kwock et al. describes photodefinable dielectric layers comprising poly(aromatic diacetylenes). The poly(aromatic diacetylene) can be copolymerized with monomers, such as 4,4'-bis(3-ethynylphenoxy)octafluorobiphenyl, to produce a thermosetting polymer.

U.S. Pat. Nos. 5,827,907 and 5,834,537 to Gotra et al. both disclose thermosetting resins in which a thermoplastic polymer is dispersed. The thermosetting material may be an acetylene-terminated resin modified with a dultice fluorine-containing poly(arylene ether). The thermoplastic polymer is fluorine-containing.

U.S. Pat. No. 6,124,421 to Lau et al. sets forth poly (arylene ether) compositions which form dielectric layers. This disclosure provides a method for synthesizing bis(4-fluorophenyl)ethyne.

U.S. Pat. Nos. 5,965,679 and 6,288,188 disclose polyphenylene oligomers and polymers useful as dielectric resins in microelectronic fabrication. These polymers, which may be thermosetting, involve the reaction product of a biscyclopentadienone and a polyfunctional acetylene.

BRIEF SUMMARY OF THE INVENTION

A new class of compounds useful as monomers in the formation of polymers which have lower dielectric constants than the polymeric films heretofore employed in electrically insulating conductive layers of integrated circuits has now been discovered. This new class of monomers is reacted with monomers employed in the prior art to polymerize polyphenylenes having lower dielectric constants than heretofore known in the art. These new monomers are characterized by the inclusion of fluorine substituents on ring carbon atoms to produce polymers which include fluorine. These polymers do not emit fluorine when subjected to temperatures to which films of low dielectric constant polymers, employed in integrated circuits, are usually exposed.

In accordance with the present invention a new class of fluorinated arylacetylene compounds has been developed which can be polymerized to produce a very low dielectric constant polymer useful in the fabrication of microelectronic devices. The arylacetylene compound within the scope of the present invention is selected from the group consisting of a compound having the structural formula

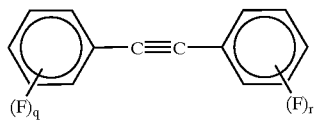

where q and r are the same or different and are integers of 1 to 5; a compound having the structural formula

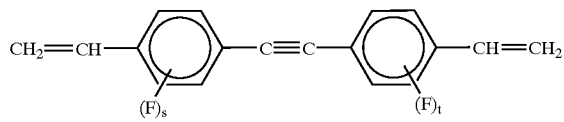

where s and t are the same or different and are integers of 1 to 4; a compound having the structural formula

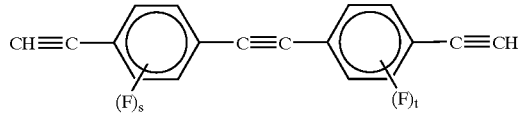

where s and t have the meanings given above; a compound having the structural formula

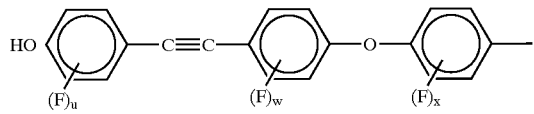

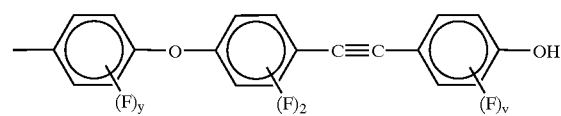

where u, v, w, x, y and z are the same or different and are integers of 1 to 4; and a compound having the structural formula

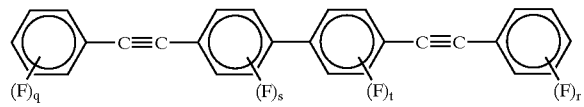

where q, r, s and t have the meanings given above.

In further accordance with the present invention polymers having very low dielectric constant are provided. The polymers of the present invention are reaction products of the acetylene compounds of the present invention and a diphenyl oxide cyclopentadienyl compound having the structural formula

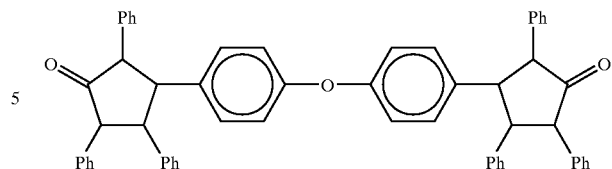

where Ph is phenyl.

DETAILED DESCRIPTION

The new monomers employed in the polymerization of copolymers having low dielectric constants are polyfunctional compounds having acetylenic functionality and are characterized by inclusion of fluorine substituents. One such compound has the structural formula

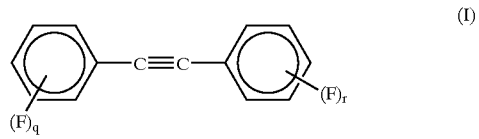

(I)

where q and r are the same or different and are integers of 1 to 5. Preferably, q and r in the compound of formula I are the same and are 1 to 5. More preferably, q and r are 5.

A second polyfunctional compound having acetylenic functionality and including fluorine substituents has the structural formula

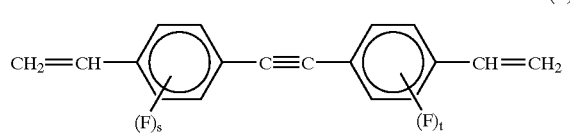

(II)

where s and t are the same or different and are integers of 1 to 4. Preferably, s and t are the same and are integers of 1 to 4. More preferably, s and t are 5.

A third polyfunctional compound having acetylenic functionality and characterized is a compound having the structural formula

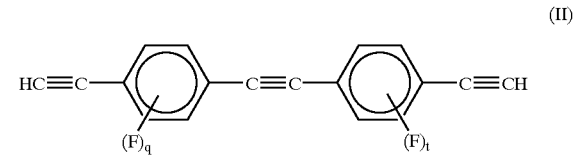

(II)

where s and t have the meaning given for compound II. Preferred and more preferred meanings of s and t emulate the preferred and more preferred meanings of s and t in formula II.

A fourth polyfunctional compound having acetylenic functionality and characterized by the presence of fluorine substituents is a compound having the structural formula

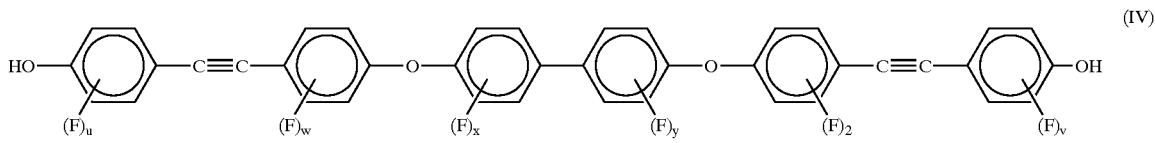

(IV)

where u, v, w, x, y and z are the same or different and are integers of 1 to 4. Preferably, u, v, w, x and y are the same and are integers of 1 to 4. More preferably, u, v, w, x and y are 4.

A fifth polyfunctional compound having acetylenic functionality and having fluorine substituents is a compound having the structural formula

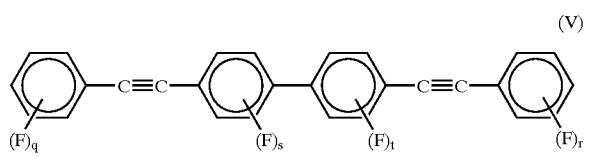

(V)

where q, r, s and t have the meanings given above.

The compound having the structural formula I is prepared by reacting diphenyl acetylene having the formula

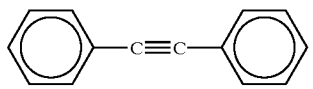

with nitric acid in the presence of sulfuric acid to produce $O_2N$

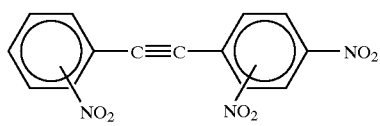

This product, in turn, is reduced in the presence of an iron catalyst in ethanol solution and with hydrogen chloride reflux to produce the equivalent amine having the structural formula

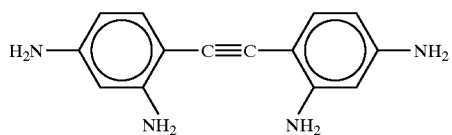

This product, produced a yield of about 74%, is reacted in the presence of HONO in acid media and $HBF_4$ to produce

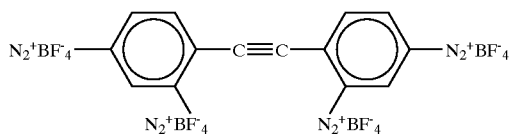

upon heating, produces

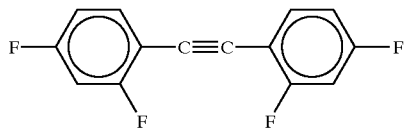

Other compounds within the contemplation of the compound having the formula I are produced by repeating the above steps to substitute additional fluorine atoms on the ring carbon atoms.

The compounds having the structural formulae II and III are prepared by reacting diethylbiphenylacetylene having the formula

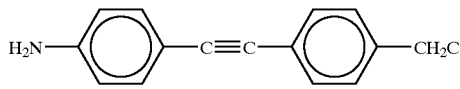

with bromine in the presence of heat to yield

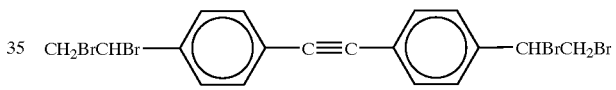

This product is fluorinated in accordance with the procedure employed in the synthesis of the compound having the structural formula I to produce the compound having the formula II.

To produce the compound having the structural formula III, the brominated compound,

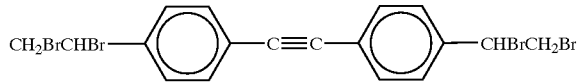

is reacted with 2 moles of potassium hydroxide per mole of the brominated compound, in the presence of ethanol, to produce the compound

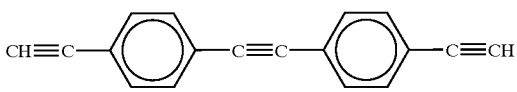

This compound is then fluorinated in accordance with the synthesis of the compound having the structural formula I to produce compounds having the structural formula III.

The synthesis of the compound having the structural formula IV is prepared by reacting fluorinated biphenyl with fluorinated biphenol acetylene. That is, a compound having the formula

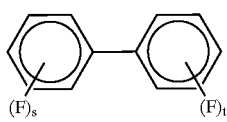

where s and t have the meanings given above, is a reacted with a compound having the formula

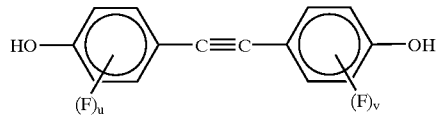

where u and v have the meanings given above.

Compounds within the contemplation of fluorinated biphenol acetylene are prepared by reacting biphenylacetylene with $HSO_3^+$ ions in the presence of sulfuric acid to produce

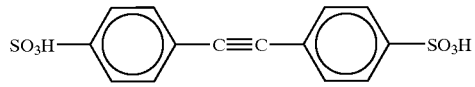

which is converted, in the presence of sodium hydroxide and hydronium ions at about

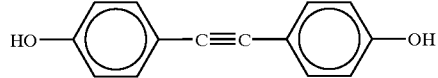

300° C., to biphenol acetylene having the formula.

The biphenol acetylene is fluorinated, to the degree desired, in accordance with the procedure utilized in the formation of the compound having the structural formula I, to produce the compound having the structural formula IV.

Turning to the synthesis of the compound having the structural formula V, that synthesis involves the bromination of diethyl biphenyl having the structural formula

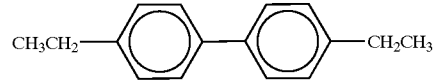

by contacting that compound with bromine to produce the compound

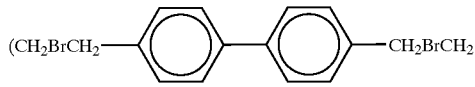

That compound is reacted with lithium in pentane solution to produce

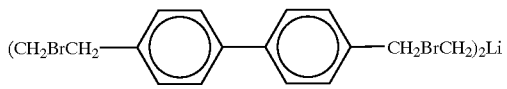

This organolithium compound is reacted with copper iodide in ether to produce

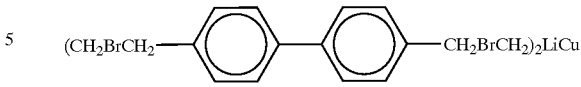

which is reacted, in turn, with phenyliodide to produce

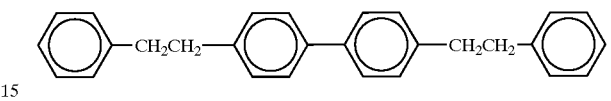

This compound is contacted with bromine under heating to produce

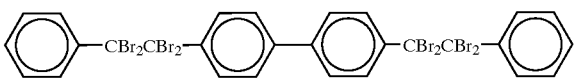

This brominated compound is reacted with potassium hydroxide in ethanol to produce the compound

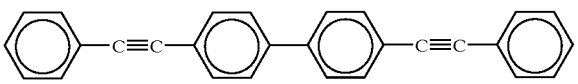

This compound is thereupon fluorinated in accordance with the procedure employed in the synthesis of the compound having the structural formula I.

It is emphasized that the above synthesis routes to the formation of the compounds having the structural formulae I to V are provided to illustrate a preferred method of manufacture. Thus, the aforementioned methods should not be interpreted as being the sole or even the most efficient synthesis method. Those skilled in the art may devise other processes for synthesizing these novel compounds.

The present invention also encompasses polymers prepared by reacting one of the monomers having the structural formula I to V with a diphenyl oxide iscyclopentadienone having the structural formula

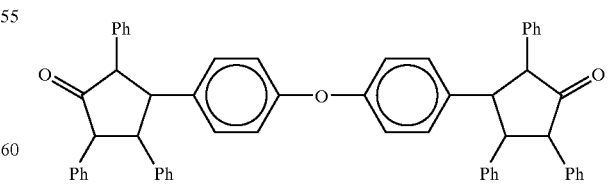

where Ph is phenyl. This polymerization reaction occurs under conditions set forth in U.S. Pat. No. 5,965,679, incorporated herein by reference.

In another embodiment of the present invention a third monomer having the structural formula

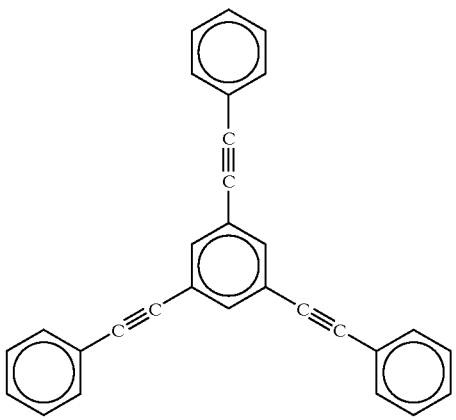

is co-reacted with the above-mentioned diphenyl oxide biscyclopentadienone and one of the five monomers having the structural formulae I to V. Again, the thermodynamic conditions, solvent system and other reaction conditions associated with this polymerization reaction are those set forth in U.S. Pat. No. 5,965,679, incorporated herein by reference.

The polymers of the present invention are utilizable in integrated circuit devices. For example, semiconductor wafers and semiconductor chips utilize the polymers of the present invention to provide requisite electrical resistance in such devices between electrically conductive elements. Thus, the present invention encompasses integrated circuit devices which include an electrical resistance effective amount of polymers of the present invention disposed between electrical conductive elements.

The above embodiments are provided to illustrate the scope and spirit of the present invention. These embodiments will suggest, to those skilled in the art, other embodiments and examples. These other embodiments and examples are within the contemplation of the present invention. Therefore, the present invention should be limited only by the appended claims.

What is claimed is:

1. A compound selected from the group consisting of a compound having the structural formula

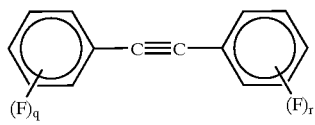

where q and r are the same or different and are integers of 2 to 5; a compound having the structural formula,

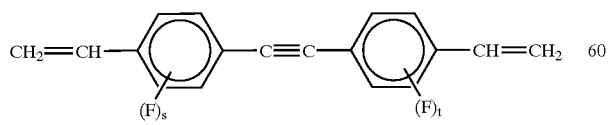

where
s and t are the same or different and are integers of 1 to 4; a compound having the structural formula

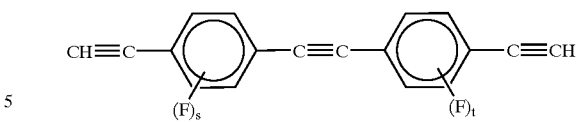

s and t have the meanings given above; a compound having the structural formula

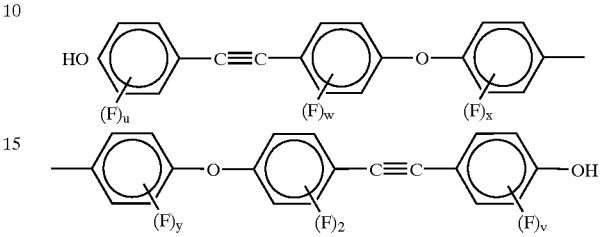

where u, v, w, x, y and z are the same or different and are integers of 1 to 4; and a compound having the structural formula

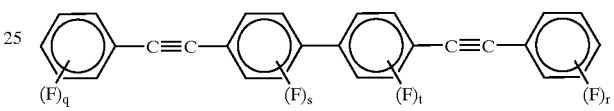

where q, r, s and t have the meanings given above.

2. A compound in accordance with claim 1 wherein said compound has the structural formula

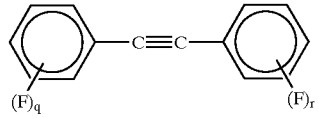

where q and r are the same and are integers of 2 to 5.

3. A compound in accordance with claim 2 wherein q and r are 5.

4. A compound in accordance with claim 1 wherein said compound has the structural formula

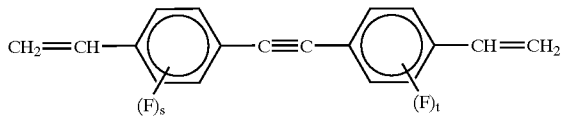

where s and t are the same and are integers of 1 to 4.

5. A compound in accordance with claim 4 wherein s and t are 4.

6. A compound in accordance with claim 1 wherein said compound has the structural formula

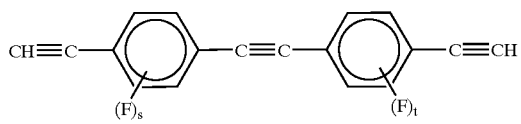

where s and t are the same and are 1 to 4.

7. A compound in accordance with claim 6 wherein s and t are 4.

8. A compound in accordance with claim 1 wherein said compound has the structural formula

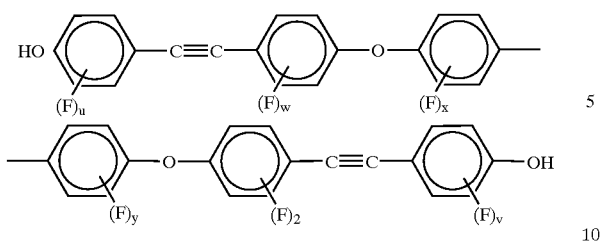

where u, v, w, x, y and z are the same and are integers of 1 to 4.

9. A compound in accordance with claim 8 wherein u, v, w, x, y and z are 4.

10. A compound in accordance with claim 1 wherein said compound has the structural formula

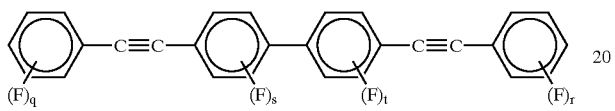

where q and r are the same and are integers of 1 to 5 and s and t are the same and are integers of 1 to 4.

11. A compound in accordance with claim 10 where q and r are 5 and s and t are 4.

12. A polymer comprising the reaction product of said compound of claim 1 and a diphenyl oxide biscyclopentadienone having the structural formula

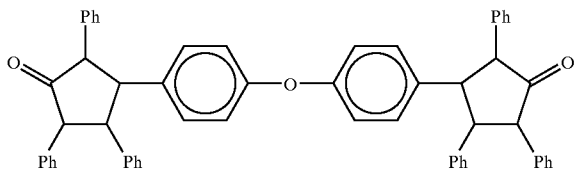

where Ph is phenyl.

13. A compound in accordance with claim 12 wherein said reaction product includes a compound having the structural formula

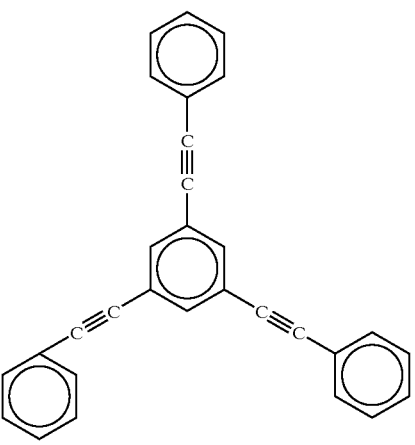

14. A compound in accordance with claim 12 wherein q and r are the same and are integers of 1 to 5 and s, t, u, v, w, x, y and z are the same and are integers of 1 to 4.

15. A compound in accordance with claim 14 wherein q and r are 5 and s, t, u, v, w, x, y and z are 4.

16. A compound in accordance with claim 13 wherein q and r are the same and are integers of 1 to 5 and s, t, u, v, w, x, y and z are the same and are integers of 2 to 5.

17. A compound in accordance with claim 16 wherein q and r are 5 and s, t, u, v, w, x and y are 4.

* * * * *